(12) United States Patent
Tamura et al.

(10) Patent No.: US 9,185,645 B2
(45) Date of Patent: *Nov. 10, 2015

(54) MOBILE COMMUNICATION SYSTEM, METHOD OF CONTROLLING THE SAME, AND RADIO BASE STATION APPARATUS

(75) Inventors: Tomu Tamura, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/143,418

(22) PCT Filed: Jan. 27, 2010

(86) PCT No.: PCT/JP2010/000461
§ 371 (c)(1),
(2), (4) Date: Jul. 6, 2011

(87) PCT Pub. No.: WO2010/089972
PCT Pub. Date: Aug. 12, 2010

(65) Prior Publication Data
US 2011/0281592 A1 Nov. 17, 2011

(30) Foreign Application Priority Data

Feb. 9, 2009 (JP) .................................. 2009-027724

(51) Int. Cl.
*H04W 52/02* (2009.01)
*H04W 4/00* (2009.01)
(Continued)

(52) U.S. Cl.
CPC ...... *H04W 52/0206* (2013.01); *H04W 52/0225* (2013.01); *H04W 4/001* (2013.01); *H04W 4/02* (2013.01); *H04W 88/08* (2013.01); *Y02B 60/50* (2013.01)

(58) Field of Classification Search
CPC .................... H04W 52/0206; H04W 52/0225; H04W 4/001; H04W 88/08; H04W 4/02; Y02B 60/50

USPC ......... 455/456.1–456.6, 422.1, 433, 458, 561
See application file for complete search history.

(56) References Cited

U.S. PATENT DOCUMENTS 6,006,096 A 12/1999 Trompower
6,584,330 B1 6/2003 Ruuska
(Continued)

FOREIGN PATENT DOCUMENTS

CN 1523908 A 8/2004
CN 1679364 A 10/2005
(Continued)

OTHER PUBLICATIONS

International Search Report for PCT/JP2010/000461 mailed May 11, 2010.
(Continued)

*Primary Examiner* — Brandon Miller

(57) ABSTRACT

A mobile communication system according to the present invention that can provide a mobile communication system capable of reducing power consumption by a radio base station apparatus includes a radio base station apparatus (1) that communicates with a mobile terminal (4), a location information management apparatus (3) that acquires location information of the mobile terminal (4), and a processing apparatus (2) that changes an operation state so that the radio base station apparatus (1) does not emit radio waves based on changes in the location information of the mobile terminal (4) acquired by the location information management apparatus (3). When the mobile terminal (4) moves from a position within a service area of the radio base station apparatus (1) to a position outside the service area, for example, the processing apparatus (2) changes the operation state so that the radio base station apparatus (1) does not emit radio waves.

4 Claims, 6 Drawing Sheets

(51) Int. Cl.
*H04W 88/08* (2009.01)
*H04W 4/02* (2009.01)

(56) References Cited

U.S. PATENT DOCUMENTS

| | | | |
|---|---|---|---|
| 7,512,381 B1* | 3/2009 | Sylvain | 455/66.1 |
| 8,248,979 B2* | 8/2012 | Kleindl | 370/311 |
| 8,594,650 B2* | 11/2013 | Tamura et al. | 455/418 |
| 2002/0025824 A1* | 2/2002 | Lin | 455/456 |
| 2009/0034443 A1* | 2/2009 | Walker et al. | 370/311 |
| 2009/0163238 A1* | 6/2009 | Rao et al. | 455/522 |
| 2009/0290561 A1 | 11/2009 | Kleindl | |
| 2010/0056184 A1* | 3/2010 | Vakil et al. | 455/456.5 |
| 2010/0151852 A1 | 6/2010 | Mori et al. | |
| 2011/0255457 A1 | 10/2011 | Tajima et al. | |

FOREIGN PATENT DOCUMENTS

| | | |
|---|---|---|
| CN | 1996913 A | 7/2007 |
| CN | 101145829 A | 3/2008 |
| CN | 101347008 A | 1/2009 |
| DE | 102005051291 A1 | 5/2007 |
| EP | 1750470 A1 | 2/2007 |
| EP | 2 073 574 A1 | 6/2009 |
| EP | 2 086 265 A2 | 8/2009 |
| JP | 2-285797 A | 11/1990 |
| JP | 10-98759 A | 4/1996 |
| JP | 10-23519 A | 1/1998 |
| JP | 10-260244 A | 9/1998 |
| JP | 2001102995 A | 4/2001 |
| JP | 2003347985 A | 12/2003 |
| JP | 2007134840 A | 5/2007 |
| JP | 2008060854 A | 3/2008 |
| JP | 2008109423 A | 5/2008 |
| JP | 2008-530897 A | 8/2008 |
| JP | 2008252330 A | 10/2008 |
| JP | 2009159355 A | 7/2009 |
| JP | 2009182619 A | 8/2009 |
| KR | 20010004627 A | 1/2001 |
| WO | 0207464 A1 | 1/2002 |
| WO | 2008136416 A1 | 11/2008 |
| WO | 2009/022534 A1 | 2/2009 |
| WO | 2009/080129 A1 | 7/2009 |
| WO | 2009148164 A | 12/2009 |
| WO | 2010044366 A | 4/2010 |

OTHER PUBLICATIONS

International Search Report for PCT/JP2010/005612 completed Dec. 14, 2010.
The extended European search report for EP10738315 dated Aug. 21, 2012.
"3rd Generation Partnership Project; Technical Specification Group Services and Systems Aspects; Network architecture (Release 8)", 3GPP Standard; 3GPP TS 23.002, 3rd Generation Partnership Project (3GPP), Mobile Competence Centre; 650, Route Des Lucioles; F-06921 Sophia-Antipolis Cedix; France, No. V8.4.0, Dec. 1, 2008, pp. 1-88, XP050361687.
"3rd Generation Partnership Project; Technical Specification Group Radio Access Network; User Equipment (UE) procedures in idle mode and procedures for cell recelection in connected mode (Release 8)", 3GPP Standard; 3GPP TS 23.002, 3rd Generation Partnership Project(3GPP), Mobile Competence Centre; 650, Route Des Lucioles; F-06921 Sophia-Antipolis Cedix; France, No. V8.4.0, Dec. 1, 2008, pp. 1-46, XP050367395.
Japanese Office Action for JP2010-549378 mailed Aug. 28, 2012.
Japanese Office Action for JP2010-261898 mailed on Nov. 27, 2012.
Korean Office Action for KR10-2011-7018465 mailed on Nov. 7, 2012.
Mitsubishi Electric, "Dynamic Setup of HNBs for Energy Savings and INterference Reduction", 3GPP TSG RAN WG3 Meeting #59bis, R3-080658, Shenzhen, China, Mar. 31-Apr. 3, 2008, XP003023429, pp. 1-6.
Siemens AG, "A method for interference control and power saving for home access point", ip.com Journal, Nokia Siemens Network, Dec. 13, 2007, XP13122942, pp. 1-3.
Chinese Office Action for CN Application No. 201080007097.9 issued on Jun. 26, 2013 with English Translation.
The Extended European Search Report for EP Application No. 10820084.1 dated on Aug. 21, 2013.
Chinese Office Action for CN Application No. 201080045108.2 issued on Jul. 22, 2014 with English Translation.
Chinese Office Action for CN Application No. 201080045108.2 issued on Mar. 26, 2014 with English Translation.
Chinese Office Action for CN Application No. 201080007097.9 issued on Jul. 29, 2014 with English Translation.

* cited by examiner

MOBILE COMMUNICATION SYSTEM, METHOD OF CONTROLLING THE SAME, AND RADIO BASE STATION APPARATUS

TECHNICAL FIELD

The present invention relates to a mobile communication system and a method of controlling the same, and more specifically, to a mobile communication system and a method of controlling the same to achieve reduction in power consumption by a radio base station.

BACKGROUND ART

A mobile communication system includes a radio communication network (RAN: Radio Access Network) and a core network (CN: Core Network). Typically, the RAN includes a radio base station apparatus that directly communicates with a mobile terminal, and a control device that controls the radio base station apparatus. Further, the CN serves as a switching equipment of speech communication, and packet communication.

The radio base station apparatus in the mobile communication system is operated after execution of various tests and setting of various parameters. Due to this, the radio base station apparatus is able to provide a service area, which is an environment where communication is possible, for a mobile terminal.

Meanwhile, a technique of reducing power consumption by a radio base station apparatus has recently been attracting attention. This is due to the strong demand for reduction in cost of communication in radio base station apparatuses that are provided by general consumers or corporations at home or offices in addition to general radio base station apparatuses.

Patent literature 1 discloses a technique related to reduction in power consumption by a radio base station apparatus. FIG. 7 is a diagram for describing a radio base station apparatus according to Patent literature 1. In FIG. 7, a radio base station apparatus 100 includes a control unit 120 that transmits/receives a signal 170 to/from a network 160, and signal processing units 130_1~130_5 respectively transmitting and receiving transmission/reception signals 171_1~171_5 to and from the control unit 120. The radio base station apparatus 100 further includes a transmitter/receiver 140 that transmits and receives transmission/reception signals 172_1~172_5 transmitted or received to or from these signal processing units to and from the mobile terminal through an antenna 150. The control unit 120 controls the signal processing units 130_1~130_5 by transmitting/receiving control signals 181_1~181_5, respectively, and controls the transmitter/receiver 140 by a control signal 182. Further, the control unit 120 is connected to a terminal number estimating unit 110, and acquires an estimated value of the number of terminals using a signal 180.

In the radio base station apparatus shown in FIG. 7, the terminal number estimating unit 110 estimates the number of mobile terminals present in a service area on the basis of the number of location registrations of the mobile terminals, the number of access request messages from the mobile terminals, or the number of incoming call notification messages to the mobile terminals. Further, the control unit 120 turns off power supplies of unnecessary signal processing units 130_1~130_5 on the basis of the estimated number of the mobile terminals.

Further, Patent literature 2 discloses a technique related to a mobile radio antenna control system using a GPS (Global Positioning System). FIG. 8 shows a mobile radio antenna control system disclosed in Patent literature 2. In FIG. 8, a base station 209 includes a base station apparatus 205, an antenna direction and transmission output controller 206, a base station receiving antenna 208, and a base station transmitting antenna 207. Further, a mobile station 204 includes a mobile station apparatus 201, a location detection apparatus 202, and a mobile station antenna 203.

The mobile radio antenna control system related to Patent literature 2 calculates at which location the mobile station 204 is present based on the location information received by the base station apparatus 205. Then the base station apparatus 205 transmits radio waves having directivity in an optimum transmission direction with an optimum transmission output in consideration of the location of the mobile station 204.

CITATION LIST

Patent Literature

Patent Literature 1
Japanese Unexamined Patent Application Publication No. 2003-347985
Patent Literature 2
Japanese Unexamined Patent Application Publication No. 2001-102995

SUMMARY OF INVENTION

Technical Problem

However, according to the technique disclosed in Patent literature 1, not all the power supplies of the signal processing units 130_1~130_5 are turned off but radio waves are constantly emitted even when there is no mobile terminal that exists in the certain area. Further, other parts than the signal processing unit keeps operating, which results in electric power being consumed even when there is no mobile terminal that exists in the certain area.

Further, also in the technique disclosed in patent literature 2, the radio base station apparatus keeps emitting radio waves even when there is no terminal that exists in the certain area, which results in electric power being consumed.

An object of the present invention is to provide a mobile communication system, a method of controlling the same, and a radio base station apparatus that are capable of reducing power consumption of the radio base station apparatus.

Solution to Problem

A mobile communication system according to the present invention includes: a radio base station apparatus that communicates with a mobile terminal; a location information management apparatus that acquires location information of the mobile terminal; and a processing apparatus that changes an operation state so that the radio base station apparatus does not emit radio waves based on changes in the location information of the mobile terminal acquired by the location information management apparatus.

A radio base station apparatus according to the present invention includes: a location information acquisition means for acquiring location information of a mobile terminal; and an operation state change means for changing an operation state so that the radio base station apparatus does not emit radio waves based on changes in the location information of the mobile terminal.

A processing apparatus according to the present invention includes: a location information acquisition means for acquiring location information of a mobile terminal; and an operation state change means for changing an operation state so that a radio base station apparatus does not emit radio waves based on changes in the location information of the mobile terminal.

A method of controlling a mobile communication system according to the present invention includes: acquiring location information of a mobile terminal that communicates with a radio base station apparatus; and changing an operation state so that the radio base station apparatus that communicates with the mobile terminal does not emit radio waves based on changes in the location information of the mobile terminal.

Advantageous Effects of Invention

According to the present invention, it is possible to provide a mobile communication system, a method of controlling the same, and a radio base station apparatus that are capable of reducing power consumption of the radio base station apparatus.

DESCRIPTION OF EMBODIMENTS

First Exemplary Embodiment

Figure 1:
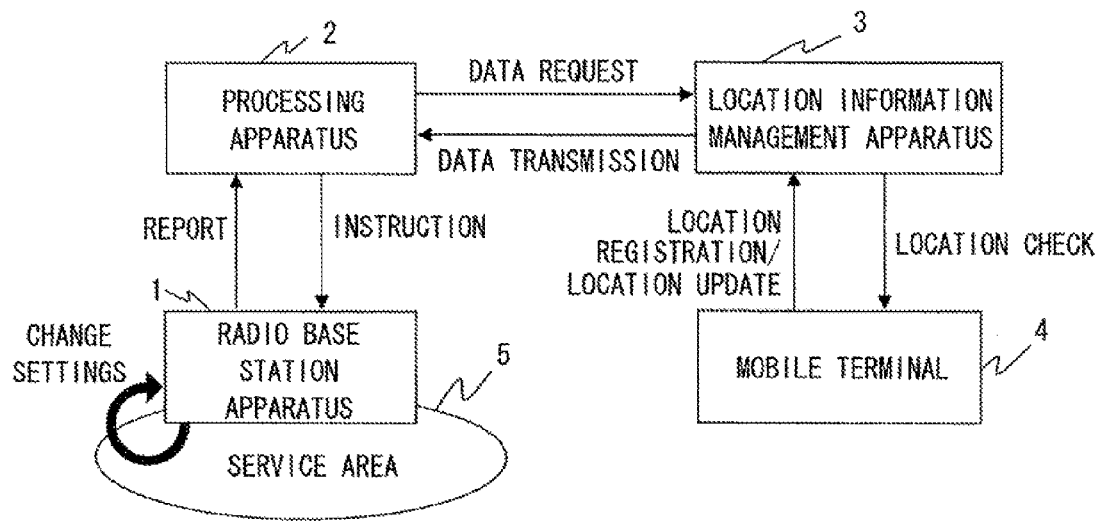
FIG. 1 is a diagram for describing a mobile communication system according to a first exemplary embodiment.

Hereinafter, a first exemplary embodiment of the present invention will be described with reference to the drawings. FIG. 1 is a diagram for describing a mobile communication system according to the first exemplary embodiment. The mobile communication system according to the first exemplary embodiment includes a radio base station apparatus 1 that communicates with a mobile terminal 4, a location information management apparatus 3 that acquires location information of the mobile terminal 4, and a processing apparatus 2 that changes operation states of the radio base station apparatus 1 based on changes in the location information of the mobile terminal 4 acquired by the location information management apparatus 3. Although the processing apparatus 2 is separately provided in FIG. 1, it may be included in the radio base station apparatus 1 or in the location information management apparatus 3.

The radio base station apparatus 1 is an apparatus that communicates with the mobile terminal 4. The radio base station apparatus 1 has functions of performing radio communication with the mobile terminal 4 and of capable of changing settings of itself according to instructions by a higher-level device.

The processing apparatus 2 acquires information to switch the operation state of the radio base station apparatus 1 from the location information management apparatus 3. The processing apparatus 2 is connected to a plurality of radio base station apparatuses, and sets the operation state of each radio base station apparatus 1 according to the changes in the location information of the mobile terminal 4. To achieve this function, the processing apparatus 2 has a function of exchanging information with the radio base station apparatus 1 and the location information management apparatus 3, to hold the necessary information.

The location information management apparatus 3 is an apparatus that holds information that can identify the location of the mobile terminal 4. The location information management apparatus 3 receives data regarding location information regularly from the mobile terminal 4, or when receiving a location registration request/location update request from the mobile terminal 4. The location information management apparatus 3 further has a function of storing the data in a form that can be passed to the processing apparatus 2.

Next, an operation of the mobile communication system according to the first exemplary embodiment will be described. When the location information of the mobile terminal 4 is changed, the mobile terminal 4 notifies the location information management apparatus 3 of the change in the location information of the mobile terminal 4. Upon receiving this, the location information management apparatus 3 updates the stored location information to the latest information.

The processing apparatus 2 requests data from the location information management apparatus 3, to receive the location information of the mobile terminal 4. Then, the processing apparatus 2 sets the operation state of the radio base station apparatus 1 based on the location information. Setting of the operation state includes turning off a power supply of the radio base station 1, turning on the power supply, preventing radio waves from being emitted (regardless of whether the power supply is ON or OFF), adjusting the volume, type, and cycle of the emitted radio waves or the like.

When the mobile terminal 4 is within the service area 5 of the radio base station apparatus 1, the location information management apparatus 3 acquires, as the location information of the mobile terminal 4, the location information that the mobile terminal 4 is within the service area 5 of the radio base station apparatus 1. Then, the processing apparatus 2 requests data from the location information management apparatus 3, to thereby acquire the location information that the mobile terminal 4 is within the service area 5 of the radio base station apparatus 1. In this case, the processing apparatus 2 keeps the state in which radio waves are emitted from the radio base station apparatus 1, so that the mobile terminal 4 can communicate with the radio base station apparatus 1.

On the other hand, when the mobile terminal 4 is not within the service area 5 of the radio base station apparatus 1, the location information management apparatus 3 acquires, as the location information of the mobile terminal 4, the location information that the mobile terminal 4 is not within the service area 5 of the radio base station apparatus 1. Then, the processing apparatus 2 requests data from the location information management apparatus 3, to thereby acquire the location information that the mobile terminal 4 is outside the service area 5 of the radio base station apparatus 1. In this case, since the mobile terminal 4 need not communicate with the radio base station apparatus 1, the processing apparatus 2 stops radio waves emitted from the radio base station apparatus 1.

Described next is a case in which the mobile terminal 4 falls within the service area 5 of the radio base station apparatus 1 from outside the service area 5. In such a case, the location information management apparatus 3 acquires, as the location information of the mobile terminal 4, the location information that the mobile terminal 4 is within the service area 5 of the radio base station apparatus 1. The processing apparatus 2 requests data from the location information management apparatus 3, to thereby acquire the location information that the mobile terminal 4 is within the service area 5 of the radio base station apparatus 1. In this case, the processing apparatus 2 allows radio waves to emit from the radio base station apparatus 1 so that the mobile terminal 4 can communicate with the radio base station apparatus 1. For example, a power supply of a radio base station apparatus may be turned on using a method like Wake-on-LAN.

As stated above, when the mobile terminal 4 falls outside the service area 5 of the radio base station apparatus 1, the operational state of the radio base station apparatus 1 is changed, which means radio waves are not emitted from the radio base station apparatus 1, thereby achieving reduction in power consumption by the mobile communication system. Further, it is possible to prevent unnecessary radio waves from being emitted when there is no mobile terminal 4 under the control of the radio base station apparatus 1, thereby making it possible to reduce interference with a neighborhood.

Next, a control method of the mobile communication system according to the first exemplary embodiment will be described. The control method of the mobile communication system according to the first exemplary embodiment includes a step of acquiring location information of the mobile terminal that communicates with the radio base station apparatus, and a step of changing the operation state so that the radio base station apparatus that communicates with the mobile terminal does not emit radio waves based on the changes in the location information of the mobile terminal.

Now, the operation state of the radio base station apparatus may be changed by turning off a power supply of the radio base station apparatus. Further, the operation state may be changed so that the radio base station apparatus does not emit radio waves when the mobile terminal moves from a position within the service area of the radio base station apparatus to a position outside the service area.

According to the control method of the mobile communication system of the first exemplary embodiment, it is possible to provide a control method of a mobile communication system that is capable of reducing power consumption of the radio base station apparatus.

Second Exemplary Embodiment

Next, a second exemplary embodiment of the present invention will be described with reference to FIG. 2. The same components as those in the first exemplary embodiment shown in FIG. 1 are denoted by the same reference symbols. The second exemplary embodiment includes a VLR (Visitor Location Register) 6 in place of the location information management apparatus 3 according to the first exemplary embodiment.

Specifically, the mobile communication system according to the second exemplary embodiment includes a radio base station apparatus 1, a processing apparatus 2, and a VLR 6.

Figure 2:
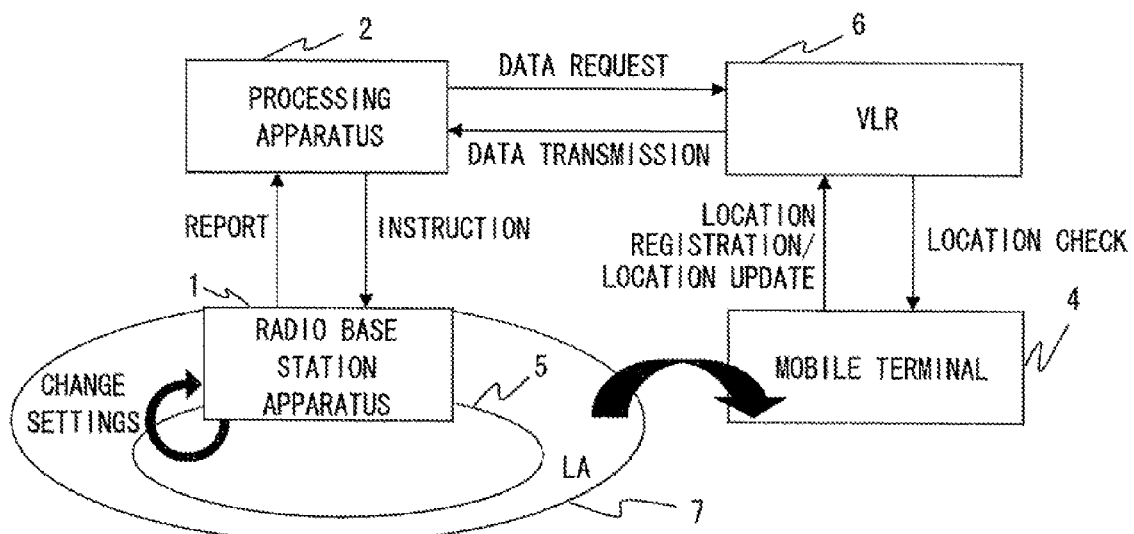
FIG. 2 is a diagram for describing a mobile communication system according to a second exemplary embodiment.

While the processing apparatus 2 is separately provided in FIG. 2, it may be included in the radio base station apparatus 1.

The radio base station apparatus 1 is an apparatus that communicates with a mobile terminal 4. The radio base station apparatus 1 has functions of performing radio communication with the mobile terminal 4 and of capable of changing settings of itself according to instructions by a higher-level device.

The VLR is an apparatus that exists in a CN (Core Network). When the mobile terminal 4 moves and enters a different LA (Location Area) 7 beyond the boundary of an LA 7 composed of a plurality of cells, the mobile terminal 4 performs location registration request/location update request. Then, the VLR 6 which is in the network area updates the location information of the mobile terminal 4.

The processing apparatus 2 acquires information to switch the operation state of the radio base station apparatus 1 from the VLR 6. The processing apparatus 2 is connected to a plurality of radio base station apparatuses, and sets the operation state of each radio base station apparatus 1 according to the changes in the location information of the mobile terminal 4. To achieve this function, the processing apparatus 2 has a function of exchanging information with the radio base station apparatus 1 and the VLR 6, to hold the necessary information.

Next, an operation of the mobile communication system according to the second exemplary embodiment will be described. When the location information of the mobile terminal 4 is changed, the mobile terminal 4 notifies the VLR 6 of the change in the location information of the mobile terminal 4. Upon receiving this, the VLR 6 updates the stored location information to the latest information.

The processing apparatus 2 requests data from the VLR 6, to receive the location information of the mobile terminal 4. The processing apparatus 2 then sets the operation state of the radio base station apparatus 1 based on this location information. Setting of the operation state includes turning off a power supply of the radio base station 1, turning on the power supply, preventing radio waves from being emitted (regardless of whether the power supply is ON or OFF), adjusting the volume, type, and cycle of the emitted radio waves or the like.

When the mobile terminal 4 is within the LA 7, the VLR 6 acquires, as the location information of the mobile terminal 4, the location information that the mobile terminal 4 is within the LA 7. Then, the processing apparatus 2 requests data from the VLR 6, to thereby acquire the location information that the mobile terminal 4 is within the LA 7. In this case, the processing apparatus 2 keeps the state in which radio waves are emitted from the radio base station apparatus 1.

On the other hand, when the mobile terminal 4 is not within the LA 7, the VLR 6 acquires, as the location information of the mobile terminal 4, the location information that the mobile terminal 4 is not within the LA 7. Then, the processing apparatus 2 requests data from the VLR 6, to thereby acquire the location information that the mobile terminal 4 is outside the LA 7. In this case, the processing apparatus 2 stops radio waves emitted from the radio base station apparatus 1.

Further, when the mobile terminal 4 falls within the area of the LA 7 from outside the range of the LA 7, the VLR 6 acquires, as the location information of the mobile terminal 4, the location information that the mobile terminal 4 is within the LA 7. Then, the processing apparatus 2 requests data from the VLR 6, to thereby acquire the location information that the mobile terminal 4 is within the LA 7. In this case, the processing apparatus 2 allows radio waves to emit from the radio base station apparatus 1.

When the mobile terminal 4 falls outside the LA 7, the operational state of the radio base station apparatus 1 is changed, which means radio waves are not emitted from the radio base station apparatus 1, to thereby achieve reduction in power consumption by the mobile communication system. Further, it is possible to prevent unnecessary radio waves from being emitted when there is no mobile terminal 4 under the control of the radio base station apparatus 1, thereby making it possible to reduce interference with a neighborhood.

Third Exemplary Embodiment

Figure 3:
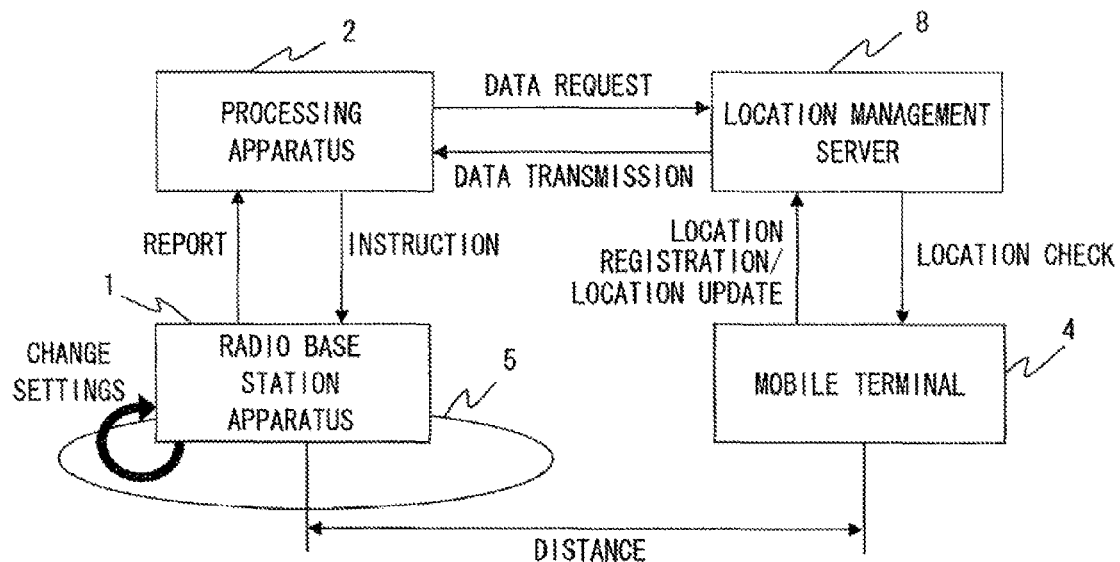
FIG. 3 is a diagram for describing a mobile communication system according to a third exemplary embodiment.

Next, a third exemplary embodiment of the present invention will be described with reference to FIG. 3. The same components as those in the first exemplary embodiment shown in FIG. 1 are denoted by the same reference symbols. The third exemplary embodiment uses a location management server 8 in place of the location information management apparatus 3 according to the first exemplary embodiment.

Specifically, the mobile communication system according to the third exemplary embodiment includes a radio base station apparatus 1, a processing apparatus 2, and a location management server 8. Although the processing apparatus 2 is separately provided in FIG. 3, it may be configured to be included in the radio base station apparatus 1.

The radio base station apparatus 1 is an apparatus that communicates with a mobile terminal 4. The radio base station apparatus 1 has functions of performing radio communication with the mobile terminal 4 and of capable of changing settings of itself according to instructions by a higher-level device.

The location management server 8 is an apparatus that is capable of storing positional information of the mobile terminal 4 obtained from the GPS. The location management server 8 updates the positional information of the mobile terminal 4 obtained from the GPS regularly from the mobile terminal 4, or when receiving a location registration request/location update request from the mobile terminal 4.

The processing apparatus 2 acquires information to switch the operation state of the radio base station apparatus 1 from the location management server 8. The processing apparatus 2 is connected to a plurality of radio base station apparatuses, and sets the operation state of each radio base station apparatus 1 according to the changes in the location information of the mobile terminal 4. In order to achieve this function, the processing apparatus 2 has a function of exchanging information with the radio base station apparatus 1 and the location management server 8, to hold the necessary information.

Next, an operation of the mobile communication system according to the third exemplary embodiment will be described. When the location information of the mobile terminal 4 is changed, the mobile terminal 4 notifies the location management server 8 of the change in the location information of the mobile terminal 4. Upon receiving this, the location management server 8 updates the stored location information to the latest information.

The processing apparatus 2 requests data from the location management server 8, to receive the location information of the mobile terminal 4. The processing apparatus 2 then sets the operation state of the radio base station apparatus 1 based on the location information. Setting of the operation state includes turning off a power supply of the radio base station 1, turning on the power supply, preventing radio waves from being emitted (regardless of whether the power supply is ON or OFF), adjusting the volume, type, and cycle of the emitted radio waves or the like.

When the distance between the mobile terminal 4 and the radio base station apparatus 1 is within the range of a service area 5 of the radio base station apparatus 1, the location management server 8 acquires, as the location information of the mobile terminal 4, the location information that the mobile terminal 4 is within the service area 5 of the radio base station apparatus 1. Then, the processing apparatus 2 requests data from the location management server 8, to thereby acquire the location information that the mobile terminal 4 is within the service area 5 of the radio base station apparatus 1. In this case, the processing apparatus 2 keeps the state in which radio waves are emitted from the radio base station apparatus 1, so that the mobile terminal 4 can communicate with the radio base station apparatus 1.

On the other hand, when the distance between the mobile terminal 4 and the radio base station apparatus 1 is away from the range of the service area 5 of the radio base station apparatus 1, the location management server 8 acquires, as the location information of the mobile terminal 4, the location information that the mobile terminal 4 is not within the service area 5 of the radio base station apparatus 1. Then, the processing apparatus 2 requests data from the location management server 8, to thereby acquire the location information that the mobile terminal 4 is outside the service area 5 of the radio base station apparatus 1. In this case, since the mobile terminal 4 need not communicate with the radio base station apparatus 1, the processing apparatus 2 stops radio waves emitted from the radio base station apparatus 1.

When the distance between the mobile terminal 4 and the radio base station apparatus 1 falls within the service area 5 from the state in which the distance is away from the range of the service area 5 of the radio base station apparatus 1, the location management server 8 acquires, as the location information of the mobile terminal 4, the location information that the mobile terminal 4 is within the service area 5 of the radio base station apparatus 1. Then, the processing apparatus 2 requests data from the location management server 8, to thereby acquire the location information that the mobile terminal 4 is within the service area 5 of the radio base station apparatus 1. In this case, the processing apparatus 2 allows radio waves to emit from the radio base station apparatus 1 so that the mobile terminal 4 can communicate with the radio base station apparatus 1.

As stated above, when the mobile terminal 4 falls outside the service area 5, the operational state of the radio base station apparatus 1 is changed, which means radio waves are not emitted from the radio base station apparatus 1, thereby achieving reduction in power consumption by the mobile communication system. Further, it is possible to prevent unnecessary radio waves from being emitted when there is no mobile terminal 4 under the control of the radio base station apparatus 1, thereby being capable of reducing interference with a neighborhood.

Fourth Exemplary Embodiment

Figure 4:
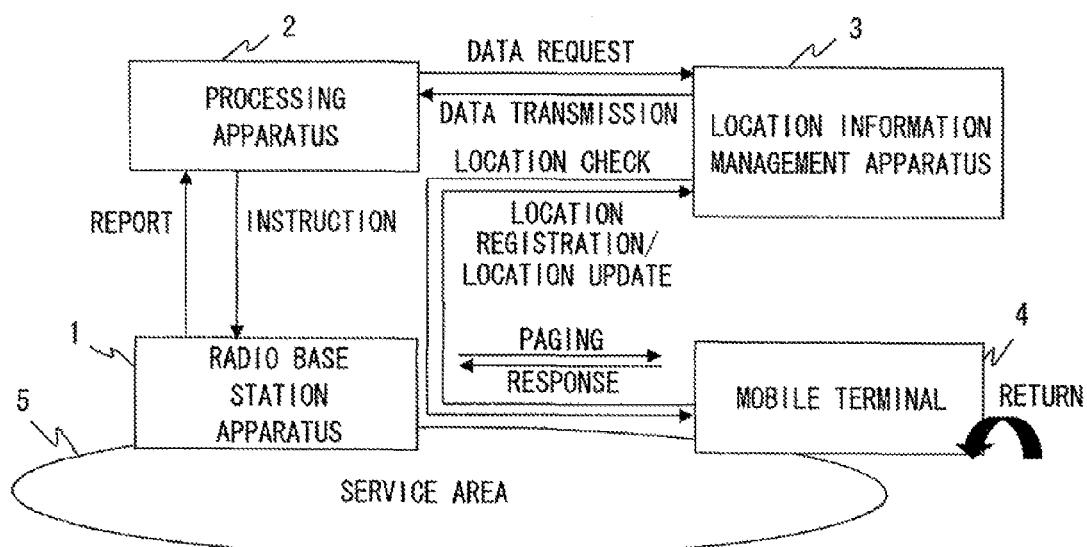
FIG. 4 is a diagram for describing a mobile communication system according to a fourth exemplary embodiment.

Next, a fourth exemplary embodiment of the present invention will be described with reference to FIG. 4. Note that the same components as those in the first exemplary embodiment shown in FIG. 1 are denoted by the same reference symbols. The fourth exemplary embodiment is different from the first exemplary embodiment in that periodic paging is performed by a radio base station apparatus 1.

Specifically, a mobile communication system according to the fourth exemplary embodiment includes a radio base station apparatus 1, a processing apparatus 2, and a location information management apparatus 3. Although the processing apparatus 2 is separately provided in FIG. 4, it may be configured to be included in the radio base station apparatus 1 or in the location information management apparatus 3.

The radio base station apparatus 1 is an apparatus that communicates with a mobile terminal 4. The radio base station apparatus 1 has functions of performing radio communication with the mobile terminal 4 and of capable of changing settings of itself according to instructions by a higher-level device.

The processing apparatus 2 acquires the information to switch the operation state of the radio base station apparatus 1 from the location information management apparatus 3. The processing apparatus 2 is connected to a plurality of radio base station apparatuses, and sets the operation state of each radio base station apparatus 1 according to the changes in the location information of the mobile terminal 4. To achieve this function, the processing apparatus 2 has a function of exchanging information with the radio base station apparatus 1 and the location information management apparatus 3, to hold the necessary information.

The location information management apparatus 3 is an apparatus that holds information with which the location of the mobile terminal 4 can be specified. In the fourth exemplary embodiment, the radio base station apparatus 1 autonomously executes periodic paging to check the presence or absence of the mobile terminal 4. When acquiring the location information of the mobile terminal 4, the radio base station apparatus 1 holds the location information in the location information management apparatus 3.

Next, an operation of the mobile communication system according to the fourth exemplary embodiment will be described. When the location information of the mobile terminal 4 is changed, the mobile terminal 4 notifies the location information management apparatus 3 of the change in the location information of the mobile terminal 4. Upon receiving this, the location information management apparatus 3 updates the stored location information to the latest information.

The processing apparatus 2 requests data from the location information management apparatus 3, to receive the location information of the mobile terminal 4. Then, the processing apparatus 2 sets the operation state of the radio base station apparatus 1 based on this location information. Setting of the operation state includes turning off a power supply of the radio base station 1, turning on the power supply, preventing radio waves from being emitted (regardless of whether the power supply is ON or OFF), adjusting the volume, type, and cycle of the emitted radio waves or the like.

When the mobile terminal 4 is within a service area 5 of the radio base station apparatus 1, or when the mobile terminal 4 responds to the paging of the radio base station apparatus 1, the location information management apparatus 3 acquires, as the location information of the mobile terminal 4, the location information that the mobile terminal 4 is within the service area 5 of the radio base station apparatus 1. Then, the processing apparatus 2 requests data from the location information management apparatus 3, to thereby acquire the location information that the mobile terminal 4 is within the service area 5 of the radio base station apparatus 1. In this case, the processing apparatus 2 keeps the state in which radio waves are emitted from the radio base station apparatus 1, so that the mobile terminal 4 can communicate with the radio base station apparatus 1.

On the other hand, when the mobile terminal 4 is not within the service area 5 of the radio base station apparatus 1, or when the mobile terminal 4 does not respond to the paging of the radio base station 1, the location information management apparatus 3 acquires, as the location information of the mobile terminal 4, the location information that the mobile terminal 4 is not within the service area 5 of the radio base station apparatus 1. Then, the processing apparatus 2 requests data from the location information management apparatus 3, to thereby acquire the location information that the mobile terminal 4 is outside the service area 5 of the radio base station apparatus 1. In this case, since the mobile terminal 4 need not communicate with the radio base station apparatus 1, the processing apparatus 2 stops radio waves emitted from the radio base station apparatus 1.

Since the location of the mobile terminal 4 is specified according to whether the mobile terminal 4 responds to the paging of the radio base station apparatus 1 according to the fourth exemplary embodiment, the radio base station apparatus 1 repeats periodic paging regularly even when the mobile terminal 4 is outside the service area 5. In other words, the radio base station apparatus does not emit radio waves during a period other than a period of executing the periodic paging.

Further, when the mobile terminal 4 falls within the service area 5 from the state in which the mobile terminal 4 is outside the range of the service area 5 of the radio base station apparatus 1, which means when the mobile terminal 4 returns to the service area 5 and responds to the periodic paging of the radio base station apparatus 1, the location information management apparatus 3 acquires, as the location information of the mobile terminal 4, the location information that the mobile terminal 4 is within the service area 5 of the radio base station apparatus 1. Then, the processing apparatus 2 requests data from the location information management apparatus 3, to thereby acquire the location information that the mobile terminal 4 is within the service area 5 of the radio base station apparatus 1. In this case, the processing apparatus 2 allows radio waves to emit from the radio base station apparatus 1 so that the mobile terminal 4 can communicate with the radio base station apparatus 1.

As stated above, when the mobile terminal 4 falls outside the service area 5 of the radio base station apparatus 1, the operational state of the radio base station apparatus 1 is changed, which means radio waves are not emitted from the radio base station apparatus 1, thereby achieving reduction in power consumption by the mobile communication system. Further, it is possible to prevent unnecessary radio waves from being emitted when there is no mobile terminal 4 under the control of the radio base station apparatus 1, thereby being capable of reducing interference with a neighborhood.

Further, since the base station apparatus 1 uses the method of periodic paging according to the fourth exemplary embodiment, it is possible to check the presence or absence in the service area in a shorter period than periodic location registration by the mobile terminal.

Fifth Exemplary Embodiment

Figure 5:
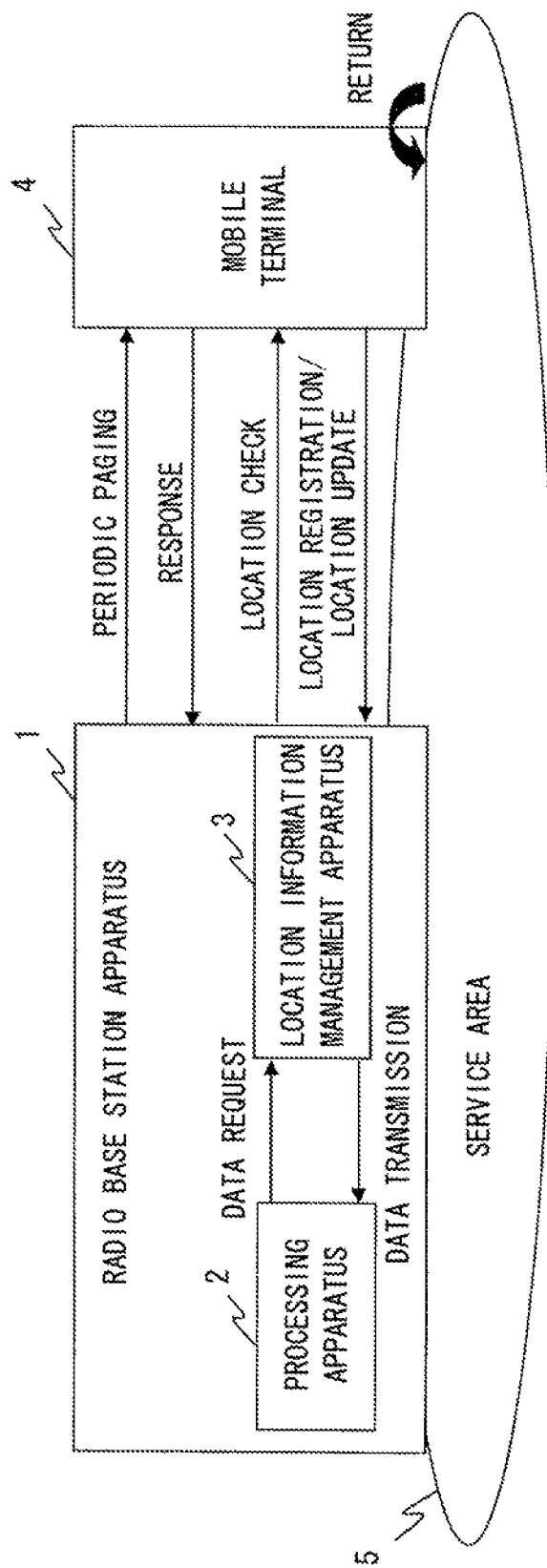
FIG. 5 is a diagram for describing a mobile communication system according to a fifth exemplary embodiment.

Next, a fifth exemplary embodiment of the present invention will be described with reference to FIG. 5. Note that the same components as those in the fourth exemplary embodiment shown in FIG. 4 are denoted by the same reference symbols. The fifth exemplary embodiment is different from the fourth exemplary embodiment in that a radio base station apparatus 1 includes a processing apparatus 2 and a location information management apparatus 3.

Specifically, a mobile communication system according to the fifth exemplary embodiment includes a radio base station apparatus 1, a processing apparatus 2, and a location information management apparatus 3. The processing apparatus 2 and the location information management apparatus 3 are provided inside the radio base station apparatus 1.

The other parts are similar to those in the fourth exemplary embodiment, and thus description will be omitted. Also in the invention according to the fifth exemplary embodiment, when a mobile terminal 4 falls outside a service area 5 of the radio base station apparatus 1, the operational state of the radio base station apparatus 1 is changed, which means radio waves are not emitted from the radio base station apparatus 1, thereby achieving reduction in power consumption by the mobile communication system. Further, it is possible to prevent unnecessary radio waves from being emitted when there is no mobile terminal 4 under the control of the radio base station apparatus 1, thereby capable of reducing interference with a neighborhood.

Further, since the base station apparatus 1 uses the method of periodic paging also in the fifth exemplary embodiment, it is possible to check the presence or absence in the service area in a shorter period than periodic location registration by the mobile terminal.

Other Exemplary Embodiments

Figure 6A:
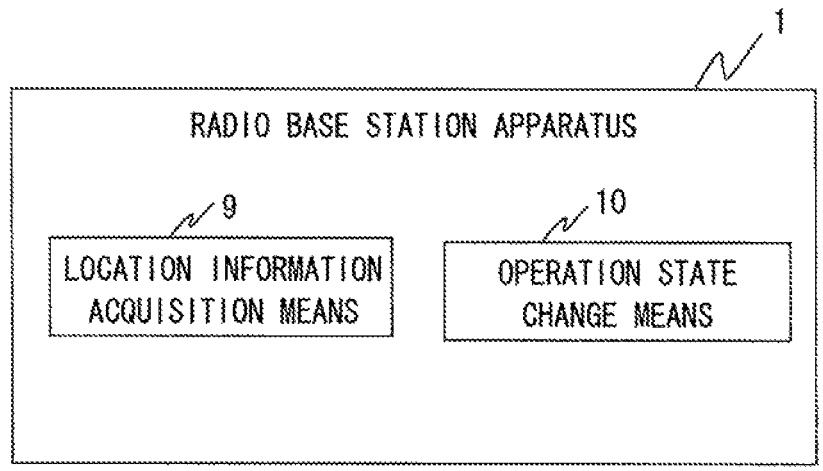
FIG. 6A is a diagram for describing a radio base station apparatus according to another exemplary embodiment.

Described next is a radio base station apparatus and a processing apparatus according to other exemplary embodiments. FIG. 6A shows a radio base station apparatus according to another exemplary embodiment. A radio base station apparatus 1 according to this exemplary embodiment includes a location information acquisition means 9 for acquiring location information of a mobile terminal, and an operation state change means 10 for changing an operation state so that the radio base station apparatus does not emit radio waves based on the change in the location information of the mobile terminal. The location information acquisition means 9 is a means for acquiring the location information from a device that holds the location information of the mobile terminal such as the location information management apparatus 3 shown in FIG. 1, for example. Further, the operation state change means 10 is a means for outputting instructions to a circuit that controls output of radio waves of the radio base station apparatus, for example. Note that the radio base station apparatus 1 may include, as the location information acquisition means 9, for example, an apparatus that acquires the location information such as the VLR, location management server and the like.

Figure 6B:
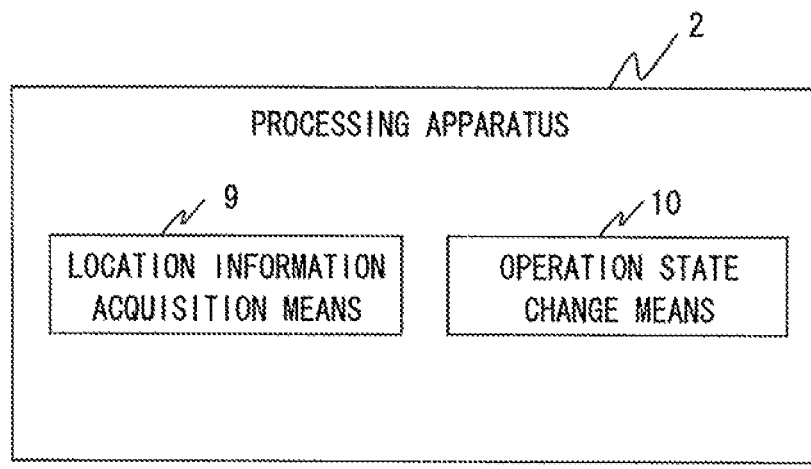
FIG. 6B is a diagram for describing a processing apparatus according to another exemplary embodiment.
Figure 7:
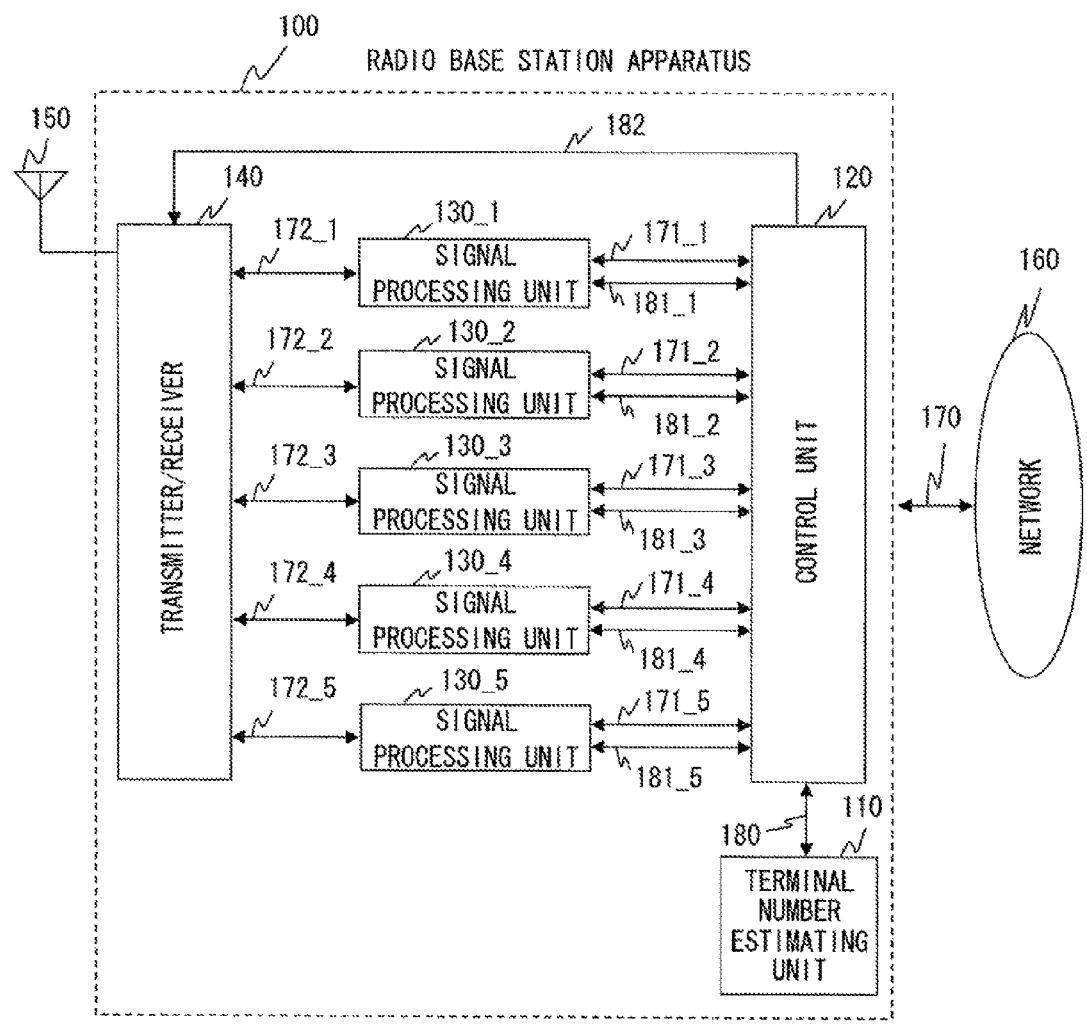
FIG. 7 is a diagram for describing a mobile communication system according to a related art.
Figure 8:
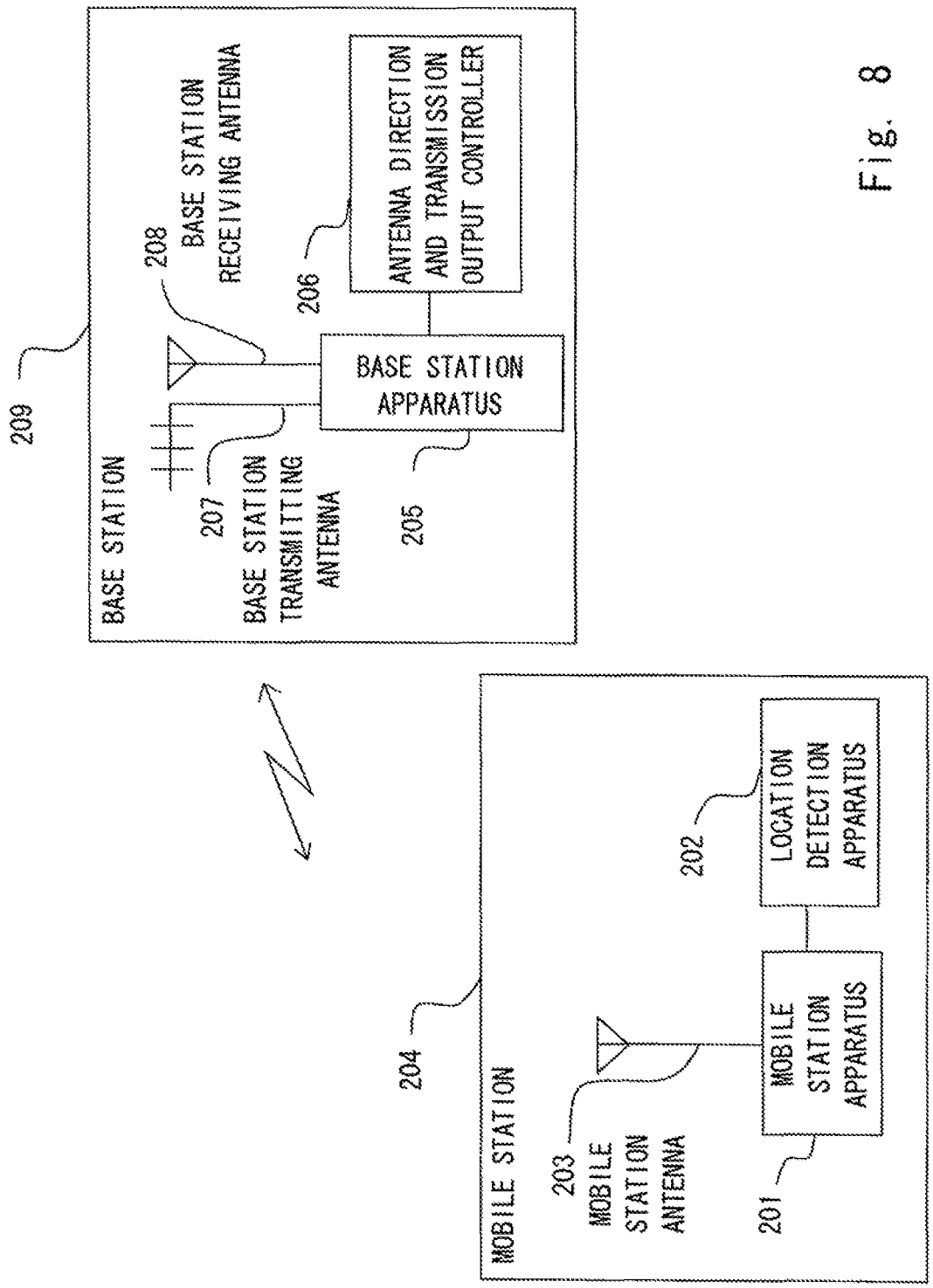
FIG. 8 is a diagram for describing a mobile radio antenna control system according to a related art.

Next, the processing apparatus according to this exemplary embodiment is shown in FIG. 6B. A processing apparatus 2 according to this exemplary embodiment includes a location information acquisition means 9 for acquiring location information of the mobile terminal, and an operation state change means 10 for changing an operation state so that the radio base station apparatus does not emit radio waves based on the change in the location information of the mobile terminal. The location information acquisition means 9 is a means for acquiring the location information from a device that holds the location information of the mobile terminal such as the location information management apparatus 3 shown in FIG. 1, for example. Further, the operation state change means 10 is a means for outputting instructions to a circuit that controls output of radio waves of the radio base station apparatus, for example. Note that the processing apparatus 2 may include, as the location information acquisition means 9, for example, an apparatus that acquires the location information such as the VLR, location management server and the like.

It is possible to reduce power consumption in the radio base station apparatus also by the radio base station apparatus and the processing apparatus according to this exemplary embodiment.

Note that the present invention is not limited to the exemplary embodiments described above, but may be changed as appropriate without departing from the spirit of the present invention. For example, according to the second exemplary embodiment, the processing apparatus 2 detecting that the boundary of LA is crossed changes the operation state of the radio base station apparatus 1. However, it is also possible for the processing apparatus 2 to detect that the boundary of RA (Routing Area) composed of a plurality of cells is crossed as is the same to LA, so as to change the operation state of the radio base station apparatus 1.

Further, the operation state of the radio base station apparatus 1 may be changed by combining the second exemplary embodiment and the third exemplary embodiment.

Furthermore, a system that turns on/off a power supply of a device connected to an external network through a device corresponding to the radio base station apparatus 1 may be included in the present invention. Due to this, for example, the operation state of a domestic information appliance can be changed according to the location of the mobile terminal 4.

Described in the exemplary embodiments stated above is using the location information of the mobile terminal in order to reduce power consumption of a radio base station apparatus. However, the present invention is not limited to the configurations described in the exemplary embodiments. For example, it is also possible to reduce power consumption of other radio base station apparatuses around the radio base station apparatus 1. More specifically, when the location information of the mobile terminal 4 is changed and the operation state of the radio base station apparatus 1 is changed, the information of the radio base station apparatus 1 (a cell ID, an HNB ID (Home NodeB ID), a scrambling code, a PCI (Physical Cell ID) or the like) held in another radio base station apparatus which is located near the radio base station apparatus 1 is updated, and another radio base station apparatus changes the operation state based on the updated information. As a result, it is possible to reduce power consumption of another radio base station apparatus around the radio base station apparatus 1.

Needless to say, while the present invention has been described in accordance with the exemplary embodiments, the present invention is not limited to the configurations stated in the exemplary embodiments, but includes various changes, modifications, and combinations that can be made by a person skilled in the art within the range of the present invention recited in claims of the present invention.

This application claims the benefit of priority, and incorporates herein by reference in its entirety, the following Japanese Patent Application No. 2009-027724 filed on Feb. 9, 2009.

REFERENCE SIGNS LIST

1 RADIO BASE STATION APPARATUS
2 PROCESSING APPARATUS
3 LOCATION INFORMATION MANAGEMENT APPARATUS
4 MOBILE TERMINAL
5 SERVICE AREA
6 VLR
7 LA

8 LOCATION MANAGEMENT SERVER
9 LOCATION INFORMATION ACQUISITION MEANS
10 OPERATION STATE CHANGE MEANS
100 RADIO BASE STATION APPARATUS
110 TERMINAL NUMBER ESTIMATING UNIT
120 CONTROL UNIT
130 SIGNAL PROCESSING UNIT
130_1~130_5 SIGNAL PROCESSING UNIT
140 TRANSMITTER/RECEIVER
150 ANTENNA
160 NETWORK
170 SIGNAL
171_1~171_5 TRANSMISSION/RECEPTION SIGNAL
172_1~172_5 TRANSMISSION/RECEPTION SIGNAL
180 CONTROL SIGNAL
181_1~181_5 TRANSMISSION/RECEPTION SIGNAL
182 CONTROL SIGNAL
201 MOBILE STATION APPARATUS
202 LOCATION DETECTION APPARATUS
203 MOBILE STATION ANTENNA
204 MOBILE STATION
205 BASE STATION APPARATUS
206 ANTENNA DIRECTION AND TRANSMISSION OUTPUT CONTROLLER
207 BASE STATION TRANSMITTING ANTENNA
208 BASE STATION RECEIVING ANTENNA
209 BASE STATION

The invention claimed is:

1. A mobile communication system comprising:
a plurality of radio base station apparatuses that communicate with each of a plurality of mobile terminals;
a location information management apparatus that acquires location information of the mobile terminals; and
a processing apparatus that is connected to the plurality of radio base station apparatuses and to the location information management apparatus and that changes an operation state of each of the plurality of radio base station apparatuses,
wherein each of the plurality of radio base station apparatuses autonomously executes a periodic paging to check presence or absence of the mobile terminal in a certain area, and sends the location information to the location information management apparatus via the processing apparatus when acquiring the location information of the mobile terminal,
wherein the processing apparatus acquires location information of each of the mobile terminals from the location information management apparatus,
wherein when no mobile terminal is present within a service area of one of the plurality of radio base station apparatuses, the processing apparatus changes the operation state of the one of the plurality of radio base station apparatuses so that the one of the plurality of radio base station apparatuses does not emit radio waves during a period other than a period of executing the periodic paging, and
wherein when the location information of the mobile terminal is changed and the operation state of the one of the plurality of radio base station apparatuses is changed, the information of the one of the plurality of radio base station apparatuses held in other radio base station apparatuses which are located near the one of the plurality of radio base station apparatuses is updated, and the other radio base station apparatuses change the operation state based on the updated information.

2. The mobile communication system according to claim 1, wherein the processing apparatus changes the operation state so that the one of the plurality of radio base station apparatuses does not emit radio waves during a period other than the period of executing the periodic paging when the mobile terminal moves from a position within a service area of the one of the plurality of radio base station apparatuses to a position outside the service area.

3. The mobile communication system according to claim 1, wherein when the mobile terminal does not respond to the periodic paging of the one of the plurality of radio base station apparatuses, the location information management apparatus acquires the location information indicating that no mobile terminal is present within the service area of the one of the plurality of radio base station apparatuses.

4. The mobile communication system according to claim 1, wherein the information of the one of the plurality of radio base station apparatuses is a cell ID, a Home NodeB ID, a scrambling code, or a Physical Cell ID.

* * * * *